United States Patent [19]

Block et al.

[11] 4,087,361
[45] May 2, 1978

[54] ACTIVATED SLUDGE SYSTEM WITH STAGGERED PARTITION BASIN

[75] Inventors: Charles S. Block, Allentown; Michael S. Chen, Macungie; Olaf J. Noichl, Whitehall; Sun-Nan Hong, Macungie, all of Pa.

[73] Assignee: Air Products and Chemicals, Inc., Allentown, Pa.

[21] Appl. No.: 776,056

[22] Filed: Mar. 9, 1977

Related U.S. Application Data

[63] Continuation of Ser. No. 616,459, Sep. 24, 1975, abandoned.

[51] Int. Cl.² .................................................. C02C 1/10
[52] U.S. Cl. .............................. 210/199; 210/201;255
[58] Field of Search ................ 210/7, 14, 15, 61, 199, 210/201, 255, 320

[56] References Cited

U.S. PATENT DOCUMENTS

| | | | |
|---|---|---|---|
| 3,054,602 | 9/1962 | Proudman | 210/201 |
| 3,438,499 | 4/1969 | Reckers | 210/199 |
| 3,547,812 | 12/1970 | McWhirter | 210/1 S |
| 3,547,814 | 12/1970 | McWhirter | 210/14 |
| 3,732,160 | 5/1973 | Klock | 210/14 |
| 3,954,606 | 5/1976 | Block et al. | 210/14 |

Primary Examiner—Thomas G. Wyse
Attorney, Agent, or Firm—Ronald B. Sherer; Barry Moyerman

[57] ABSTRACT

A wastewater treatment system of the activated sludge type is disclosed having an aeration basin provided with staggered partitions and of a particular geometrical design and mode of operation whereby more efficient purification of the wastewater may be achieved in a system of a given size.

7 Claims, 4 Drawing Figures

U.S. Patent    May 2, 1978    4,087,361
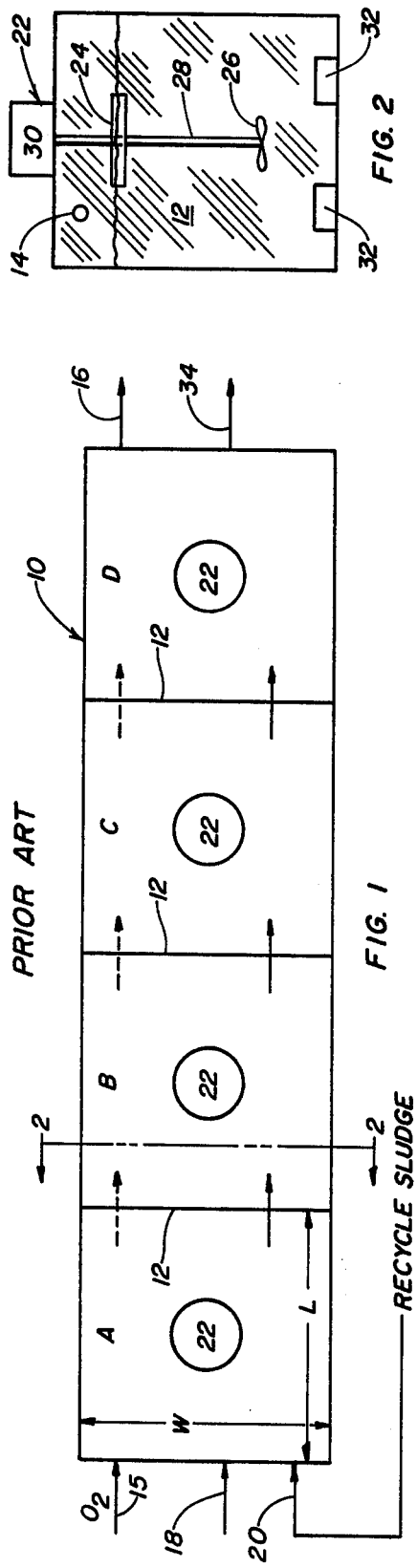
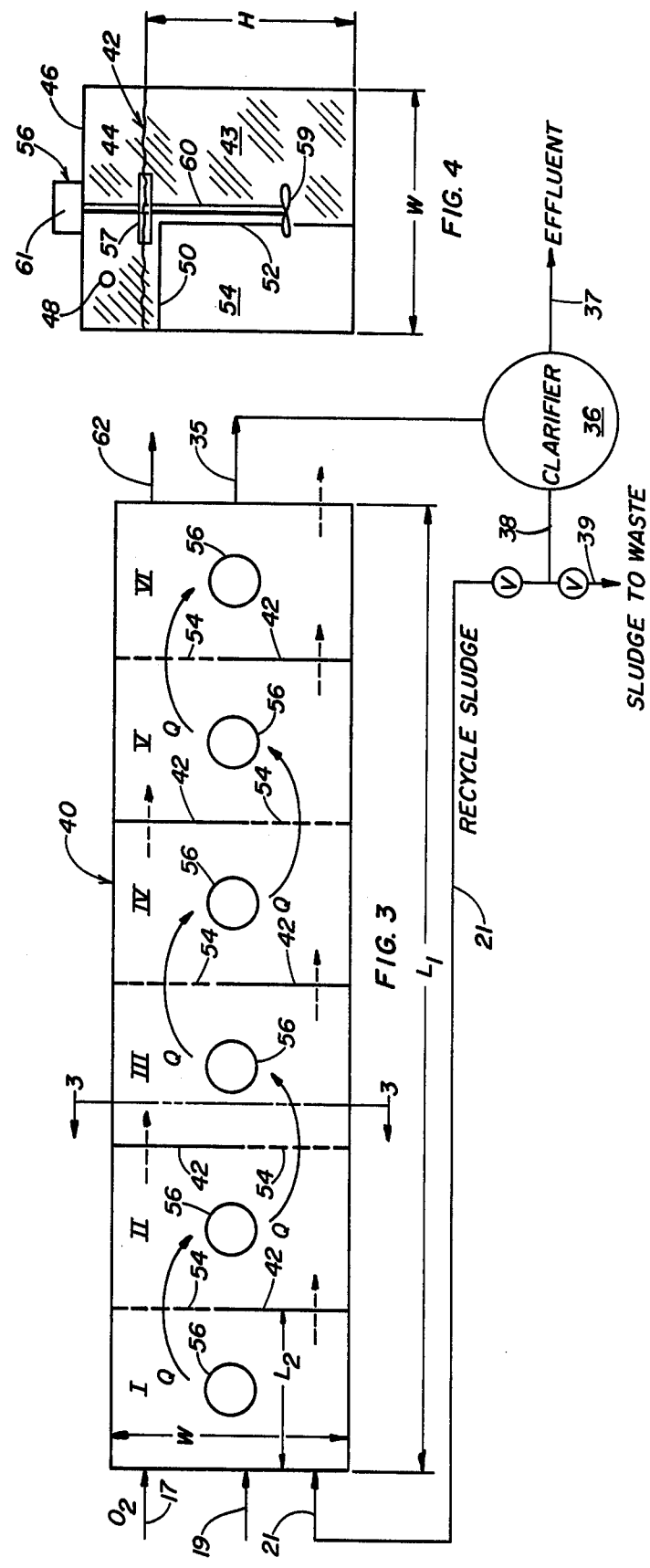

ACTIVATED SLUDGE SYSTEM WITH STAGGERED PARTITION BASIN

This is a continuation of application Ser. No. 616,459, filed Sept. 24, 1975, now abandoned.

BACKGROUND OF THE INVENTION

It has previously been proposed to use oxygen-rich aeration gas in covered aeration basins of activated sludge systems for reducing the biochemical oxygen demand (BOD) and/or the nitrogenous oxygen demand (NOD) of influent wastewater streams; BOD and/or NOD being hereinafter referred to as the oxygen demand. Such activated sludge systems have employed aeration basins in which the mixed liquor, composed of the influent wastewater and recycled sludge, is aerated in a series of stages formed by staging walls extending throughout the depth and width of the liquid flow path through the basin so as to form physically separated liquid stages. The geometry of each such liquid stage was selected, and each stage was aerated by a liquid-gas mixing device in such a manner that the mixed liquor had a substantially uniform oxygen demand throughout each liquid stage; this mode of operation of each stage being "completely mixed" as this term is used in the waste treatment art. Accordingly, the prior art systems utilized a series of such completely mixed liquid stages with the mixed liquor flowing from one completely mixed liquid stage to the next completely mixed liquid stage through very small, restricted openings in the liquid staging wall such that virtually no backmixing occurred; i.e., no mixed liquor from a downstream stage was permitted to flow backwards to an upstream stage.

Such prior art systems also staged the flow of the aeration gas by dividing the aeration basin into a plurality of gas stages which were physically separated from each other by the upper portion of the same wall forming the liquid staging wall, or alternatively, by a gas baffle extending from the cover of the basin into the uppermost layer of the mixed liquor. For example, one such gas and liquid staged system is taught in U.S. Pat. No. 3,547,815. Also, this general type of prior art system is illustrated in FIGS. 1 and 2 of the present drawings and will be further described hereinafter.

On the other hand, a substantially different and improved basin design and mode of operation has been discovered and is disclosed in copending application Ser. No. 414,770 now U.S. Pat. No. 3,954,606 which eliminates the need for liquid staging walls and permits the operation of the aeration basin, or portions thereof, in either a mode of operation which approaches the completely mixed mode known in the art as the CMAS mode, or which achieves a high degree of effective liquid staging by selectively varying the backflow ratio. That is, while the gas may be staged by the provision of gas baffles, the liquid flowpath through the basin is not obstructed by walls or partitions extending throughout the depth of the mixed liquor. Rather, the initial design of the basin and the aerator mixing factor $N \times D/U$ is maintained within certain ranges so as to control the backflow ratio and thereby control the degree of interzone mixing of the mixed liquor between adjacent liquid zones as more fully described in that application.

The present invention retains all of the advantages of the system and mode of operation disclosed in U.S. Pat. No. 3,954,606 and, in addition, enables the basin to be operated in a mode of operation in which the number of effective liquid stages is greater than the number of actual or effective liquid stages previously obtainable within a basin of a given length. As a result, the present invention enables the oxygen demand of the influent to be reduced to a lower level with the same or less horsepower previously required. Alternatively, the same degree of reduction of the oxygen demand; i.e., the same degree of purification may be achieved in an aeration basin of smaller volume than that previously required.

The present invention is based upon several different but interrelated discoveries which include the provision of staggered partitions extending partially across the width of the liquid flow path between aerators, the geometry of the liquid zones surrounding each aerator, the value of the aerator mixing factor which is utilized, and the size of the open, unobstructed portion of the liquid flow path between adjacent liquid zones.

SUMMARY OF THE INVENTION

The present invention provides a method and apparatus for aerating mixed liquor in an activated sludge waste treatement system with aeration gas in which the geometry of the basin, and the mode of operation of the aerators aerating the mixed liquor, produce a series of liquid zones through which the mixed liquor flows in a generally serpentine manner from one noncompletely mixed liquid zone to the next such that the degree of effective liquid staging is substantially greater than that achieved in any of the known prior art. As a result, significantly more efficient purification of the influent wastewater stream can be achieved.

BRIEF DESCRIPTION OF THE DRAWINGS

FIG. 1 is a top, plan view of an aeration basin of the typical prior art design;

FIG. 2 is a cross-sectional view taken along view line 2—2 of FIG. 1 showing the details of a typical liquid staging wall of the prior art design;

FIG. 3 is a top, plan view of an activated sludge system according to the present invention; and FIG. 4 is a cross-sectional view taken along view line 3—3 showing one detailed form of a staggered partition utilized in the present invention.

DETAILED DESCRIPTION

FIGS. 1 and 2 illustrate a typical design of a prior art aeration basin in which the overall basin was divided into four physically separated gas and liquid stages A–D by staging walls 12 extending from the cover of the aeration basin to the floor and from one side wall to the opposite side wall. The aeration gas is shown as being supplied to the basin through inlet line 15 and each of staging walls 12 is shown as including a gas port 14 through which the aeration gas flows in a staged manner from one gas stage to the next, as represented by the dotted flow arrows, until it is vented from the system through vent line 16.

As illustrated, the influent wastewater is introduced through line 18 to stage A along with recycled sludge through line 20, and these are mixed by aerator 22 so as to form the so-called mixed liquor. While various types of mixing and aeration devices have been used in the prior art, FIGS. 1 and 2 illustrate the aerator as comprising a surface impeller 24 and a solids mixing impeller 26 driven through a shaft 28 by a motor 30. In the prior art systems, the aeration devices not only recirculated the mixed liquor in contact with the oxygen-rich aeration gas, but were also operated so as to completely mix the raw influent, the recycled sludge and the existing mixed liquor in a completely mixed mode such that the mixed liquor had a substantially uniform oxygen demand throughout all portions of the first stage. In order to promote such complete mixing with the resultant uniform oxygen demand throughout the stage, each of the gas-liquid stages, such as A–D, were designed so as to have the width (W) equal to the length (L) surrounding each aerator so that the ratio of L/W was equal to 1.

The mixed liquor then flowed in a uni-directional manner as indicated by the solid flow lines through one or more small ports 32 into the adjacent gas-liquid stage B. Again, the mixed liquor was maintained in a completely mixed condition and similarly flowed in a uni-directional manner through the small openings 32 in each of the remaining liquid staging walls so that the oxygen demand was sequentially reduced in each of the gas-liquid stages. Thus, the reduction of the oxygen demand was performed in distinct, step wise fashion with the oxygen demand being uniform within each stage, and at progressively lower values in each succeeding stage. The aerated mixed liquor was then withdrawn from the last gas-liquid stage D through a suitable conduit 34 and passed to a settler or clarifier (not shown) in which the sludge and purified effluent were separated. The purified effluent was then discharged from the clarifier, while a portion of the settled sludge was recycled to first stage A through recycle line 20.

FIG. 3 illustrates the wastewater purification system of the present invention which includes an aeration basin 40 into which wastewater is supplied by line 19 while recycled sludge is supplied by line 21, and oxygen-rich aeration gas is supplied by line 17. Before describing the detailed design and operation of basin 40, it will be understood that the aerated effluent flows from basin 40 through line 35 to a settler or clarifier 36 from which the purified effluent is discharged through line 37. The settled sludge is discharged through line 38 and is divided into a waste stream in line 39 and the recycle sludge stream in line 21 which returns to the initial portion of the aeration basin 40. Of course, various modifications may be made in the overall activated sludge system from that schematically illustrated such as by employing step-wise feeding of influent and/or recycled sludge to more than one portion of basin 40, and other well known techniques such as using aeration feed gas of widely varying oxygen content.

FIGS. 3 and 4 illustrate one preferred structural design and mode of operation of aeration basin 40. It has been determined that, although the present invention is applicable to aeration basins having various rectangular shapes, the overall length ($L_1$) to width (W) ratio should be within the range of 1.2 to 6, and preferably within the range of 1.8 to 4. It has also been discovered that, for a basin length equal to that of the prior art design, the basin should not be divided into separate, liquid stages by staging walls 12, but rather, should be formed so as to provide a plurality of liquid zones or passes by the provision of a plurality of staggered partitions 42. Partitions 42 are preferably formed of a one-piece construction having a lower portion 43 extending through the mixed liquor to the bottom of the basin, and an upper portion 44 extending up to the basin cover 46. Upper portion 44 preferably extends the full width of the basin and is provided with a small gas staging port 48 through which the aeration gas may pass from one gas stage to the next gas stage. Port 48 may be as shown, or may comprise a small rectangular opening adjacent the side wall. Alternatively, the upper portion 44 may be entirely solid and the gas may be conducted from one gas stage to the next through suitable piping extending upwardly through cover 46 and downwardly through the cover into the adjacent gas stage. In any event, the upper portion 44 serves only as a gas baffle providing a barrier against unrestricted gas flow, and a substantial portion of the width of upper portion 44 terminates in bottom edge 50 which should be between 6 inches and 2 feet below the liquid level.

The lower portion 43 of partition 42 extends outwardly from one side of the basin, preferably about half the width, and terminates in a vertical edge 52 such that a large open liquid flowpath 54 is provided between adjacent liquid zones or passes I through VI as further illustrated by the dotted lines 54 in FIG. 3. Alternatively, open liquid flowpath 54 may comprise a plurality of smaller flowpaths where, for example, vertical columns and/or horizontal cross-pieces are required to extend through the illustrated flowpath 54 for purposes of structural integrity. That is, it has been determined by pilot plant studies using dye tracer techniques that the benefits of the present invention may be achieved so long as the total size of the open liquid flowpath 54 is within the operable range of 30 to 80% of the wetted cross-sectional area of the basin as defined by W × H. Preferably, the percent of the open flowpath should be within the range of 40 to 60% and, for optimum results, it should be within the range of 40 to 50% of the wetted cross-sectional area of the basin.

It has also been discovered that the length to width ratio $L_2$/W of each liquid zone or pass should be at least within the range of 0.59 to 1.70. Furthermore, it has been determined that the preferred ratio of $L_2$/W should be in the range of 0.60 to 1.00, and that optimum results were obtained within the range of 0.65 to 0.85 to maximize the number of effective liquid stages.

From the foregoing description it will be apparent that the flowpath of the liquid in a basin of the present design is of a modified serpentine form illustrated by solid flow lines Q. That is, the liquid not only flows along the length of the basin, but also flows along the width of the basin such that each of liquid zones I through VI may be considered to be a short pass of a multi-pass system. Therefore, for any basin of a given width and length, the mixed liquor must flow both laterally as well as along the length of the basin as it is aerated by the aerator 56 preferably located at about the midpoint of each pass width.

One suitable form of aerator 56 is illustrated in FIG. 4 as comprising a surface impeller 57 and a solids mixing impeller 59 driven through a shaft 60 by a motor 61; however, it is to be understood that other forms of aerators have been determined to be operable in the practice of the present invention including, for example, the use of only a surface impeller without the lower, solids mixing impeller 59. Of course, it is necessary that the aeration device be capable of maintaining the solids in suspension and aerating the mixed liquor with aeration gas in each liquid zone or pass so as to maintain a desired dissolved oxygen level in the mixed liquor. Where oxygen-rich aeration gas is employed, it is passed in a staged manner from one gas stage to the next through the ports 48, or through the equivalent flow restricted passages previously described. As the oxygen-rich feed gas having an initial oxygen content in the order of 80% or higher sequentially flows through the gas stages, as represented by the dotted flow lines, the oxygen content decreases in each gas stage and is finally vented from basin 40 through vent line 62.

Although the aeration basin 40 has been illustrated as having more liquid zones or passes than the number of liquid stages in the typical prior art basin of a given length, this only partially explains the increased degree of overall effective liquid staging and the higher degree of oxygen demand removal. Pilot plant tests have shown unexpectedly superior results which cannot be explained on this basis. That is, the pilot plant repeatedly achieved effective liquid staging greater than the actual number of liquid zones, and as high as 2.0 times the actual number of liquid zones. Analysis of the pilot plant data showed that each liquid zone or pass, which was coextensive with a gas stage, and contained one aerator, was performing as though it consisted of more than one effective liquid stage. That is, in liquid pass I, for example, the oxygen demand was not uniform as it is in the completely mixed stages of the prior art systems. A significant but controlled amount of intra-zone backflow was occuring within pass I, as well as, a controlled amount of interzone backflow between pass I and pass II. This phenomenon was also occurring within and between each of the subsequent liquid zones or passes. Therefore, when using the principles of the present invention, it has been discovered that each liquid zone or pass may be designed to function as though it comprised multiple intra-zones of different oxygen demand thereby achieving substantially more than one effective liquid stage per actual liquid zone or pass. While this unexpected phenomenon is difficult to fully describe without the use of a multi-parametrical computerized mathematical model, it has been determined that this phenomenon is the result of a synergistic effect of combining the foregoing basin design parameters with certain values of the aerator mixing factor $N \times D/U$. The term aerator mixing factor is more fully explained in U.S. Pat. No. 3,954,606 which is hereby incorporated by reference. However, it will be understood that the aerator mixing factor is the dimensionless ratio $N \times D/U$ where: N is the RPM of the aerator, D is the diameter of the aerator, and U is the linear liquid velocity as determined by dividing the volume per minute of the mixed liquor passing through the aeration basin by the wetted cross-sectional area of the basin which is $W \times H$. In this regard, extensive operation of the pilot plant in accordance with the above-described basin parameters repeatedly achieved effective liquid staging greater than one effective liquid stage per liquid zone or pass when the aerator mixing factor was between 20 and 450. For even greater degrees of effective liquid staging, it was determined that the range of 30 to 300 was preferred, and the optimum values of the aerator mixing factor were found to be in the range of 50 to 250.

Since the aerator mixing factor can be varied in a selected and controlled manner, the present invention not only enables a given basin to be operated at values of effective liquid staging much greater than that previously possible, but also permits two or more liquid zones or passes to be operated at higher values of the aerator mixing factor which produces increased interzone mixing and thereby enables the system to operate at peak shock loads which might otherwise destroy or seriously impare the biological operation of the entire basin. In addition, it has been determined that the operation of the present invention in the mode where each liquid zone or pass is acting as more than one effective liquid stage enables a greater degree of oxygen demand reduction for a given length of basin, or the same degree of oxygen demand reduction in a basin with a smaller liquid volume than was previously possible. Also, the total horsepower of the plurality of aerators, each of which can be of a smaller size than of the prior art, may be less than the total horsepower of the prior art systems for a given degree of purification as measured by reduction of the oxygen demand. Accordingly, it will be apparent that the present invention achieves all of the above-indicated objects and advantages.

Since numerous modifications and variations will be apparent to those skilled in the art, it is to be understood that the foregoing description is intended to be illustrative of the principles of the invention, and that the invention is not to be limited other than as expressly set forth in the following claims.

We claim:

1. An aeration basin for aerating mixed liquor in an activated sludge system comprising:
    (a) wall means forming an elongated, rectangular basin having side walls, an inlet and an outlet end; the length to width ratio of said basin being within the range of 1.8 to 4.0;
    (b) means for supplying wastewater and recycled sludge to the inlet end of said basin to form mixed liquor therein;
    (c) a plurality of rotary aerator means located at spaced locations along the length of said basin between said inlet and outlet ends for aerating said mixed liquor flowing throughout the elongated length of said basin from said inlet end to said outlet end;
    (d) a plurality of staggered partition means extending laterally from alternate side walls for a distance in the order of one half the width of said basin, said staggered partition means extending throughout the depth of the mixed liquor and transverse to said lengthwise flow of mixed liquor and being positioned between said aerator means to form a plurality of liquid passes through which said mixed liquor flows in sequence, said liquid passes having length to width ratios within the range of 0.60 to 1.00 and forming a generally serpentine flow path through the basin, said staggered partition means being of a lateral extent and shape such as to provide open and nonrestricted liquid flow paths for backmixing between adjacent liquid passes, said non-restricted flow paths having cross-sectional areas within the range of 40% to 60% of the wetted cross-sectional area of said basin; and
    (e) said basin having a wetted cross-sectional area of such predetermined size, and said rotary aerator means having predetermined values of diameter (D) and RPM (N), such that the aerator mixing factor ($N \times D/U$) is maintained within the range of 20 to 450, whereby said aeration basin achieves a substantially greater number of effective liquid stages.

2. The aeration basin as claimed in claim 1 wherein said partition means are of a size and shape such as to provide open liquid flowpaths between adjacent liquid passes of between 40 to 50% of the wetted cross-sectional area of said basin.

3. The aeration basin as claimed in claim 1 wherein said partitions form a plurality of liquid passes having length to width ratios within the range of 0.59 to 0.85.

4. The aeration basin as claimed in claim 1 wherein said partitions form a plurality of liquid passes having length to width ratios within the range of 0.65 to 0.85.

5. The aeration basin as claimed in claim 1 wherein the size of the wetted cross-sectional area of the basin and said predetermined values of the aerator diameter (D) and the aerator RPM (N) are such as to maintain the aerator mixing factor (N × D/U) within the range of 30 to 300.

6. The aeration basin as claimed in claim 1 wherein the size of the wetted cross-sectional area of the basin and said predetermined values of the aerator diameter (D) and the aerator RPM (N) are such as to maintain the aerator mixing factor (N × D/U) within the range of 50 to 250.

7. The aeration basin as claimed in claim 1 wherein said aerators are positioned adjacent the midpoint of the basin width.

* * * * *